United States Patent [19]

Fulton et al.

[11] 3,978,657

[45] Sept. 7, 1976

[54] TURBINE SYSTEM

[75] Inventors: Garland L. Fulton, Wayne; David W. Taylor, Edgemont, both of Pa.

[73] Assignee: Combustion Turbine Power, Inc., Doylestown, Pa.

[22] Filed: Feb. 6, 1974

[21] Appl. No.: 439,994

[52] U.S. Cl. ........................ 60/39.12; 60/39.46 R
[51] Int. Cl.[2] ................ F02B 43/08; F02B 43/00
[58] Field of Search ............ 60/39.12, 39.46, 39.02, 60/39.15, 39.18 B, 39.18 R, 39.51 R; 48/206

[56] References Cited
UNITED STATES PATENTS

| | | | |
|---|---|---|---|
| 1,922,509 | 8/1933 | Thurm | 165/104 M |
| 2,288,734 | 7/1942 | Noack | 60/39.15 |
| 2,632,297 | 3/1953 | Ogston | 60/39.12 |
| 2,650,190 | 8/1953 | Steinschlaeger | 60/39.46 |
| 2,653,447 | 9/1953 | Heller | 60/39.18 B |
| 2,663,144 | 12/1953 | Nordstrom | 60/39.18 B |
| 2,699,039 | 1/1955 | Yellott | 60/39.51 |
| 2,718,754 | 9/1955 | Lewis et al. | 60/39.02 |
| 3,086,362 | 4/1963 | Foster-Pegg | 60/39.46 |
| 3,276,203 | 10/1966 | Squires | 60/39.12 |
| 3,355,883 | 12/1967 | Beam | 60/39.51 R |
| 3,446,014 | 5/1969 | Foster-Pegg | 60/39.12 |
| 3,481,834 | 12/1969 | Squires | 48/206 |
| 3,804,606 | 4/1974 | Archer et al. | 60/39.18 R |

FOREIGN PATENTS OR APPLICATIONS

| | | | |
|---|---|---|---|
| 952,852 | 5/1956 | Germany | 60/39.12 |
| 805,786 | 12/1958 | United Kingdom | 60/39.12 |

Primary Examiner—Carlton R. Croyle
Assistant Examiner—L. J. Casaregola
Attorney, Agent, or Firm—Weiser, Stapler & Spivak

[57] ABSTRACT

Coal, or other solid fossil fuel is separated into volatile and residual components. The volatiles are burned as the fuel for one or more conventional turbines. The residuals are combusted to heat a gas for the conventional turbine(s). The gaseous combustion products may be used to drive a disc-type turbine, which is relatively insensitive to particulates in the gas, and also for other purposes.

11 Claims, 1 Drawing Figure

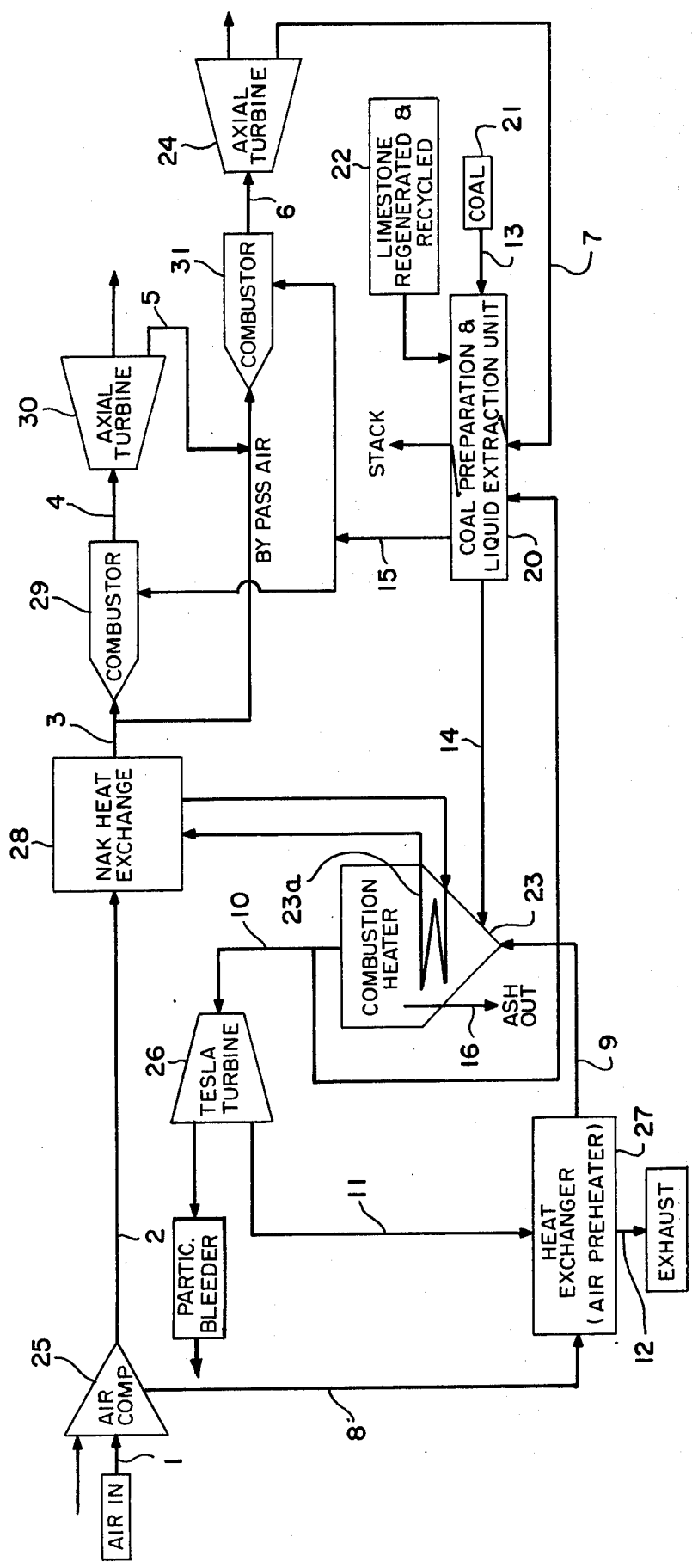

TURBINE SYSTEM

BACKGROUND OF THE INVENTION

This invention relates to the utilization of solid fossil fuels to power gas turbines.

Solid fossil fuels have previously been utilized as the energy source for the generation of shaft horsepower, primarily in conventional steam-electric generating stations. These have had to be located near an adequate supply of the water which is needed to condense low pressure steam back to water so that it can be economically pumped back up to boiler pressures for reconversion into steam. The heat injection into these waters has become increasingly severe to the point where it may even create an ecological problem near large electric consuming centers. Furthermore, these generating stations are generally located close to large urban centers, where the stack gas emissions have become objectionable contributors to atmospheric pollution.

Lately, efforts are being made to relocate power generation stations by utilizing gas turbines powered by fuels derived from solid fossil fuels, but these are meeting with problems of excessive costs in fuel preparation, low yield of usable product and excessive production of by-products.

Some attempts have also been made to pass the products of combustion of the fossil fuels through turbines, but the erosive nature of the inert material present in these combustion products has tended to cause rapid failure of the turbine parts.

SUMMARY OF THE INVENTION

Accordingly, it is one object of this invention to provide a gas turbine system which uses solid fossil fuels as the source of energy.

A further object is to provide a prime mover which can be operated independently of the cooling water typically required by steam-operated generating plants.

Yet another objective is to provide a prime mover which can be located remote from areas where thermal and atmospheric pollution levels present a problem.

Still another object is to provide a system which permits the prime mover to be located close to a coal source, thereby eliminating the costly transportation, storage and other handling of the fuel, and which also facilitates the disposal of the ash residue from combustion of the fuel.

It is still another object to provide clean, hot compressed gas for efficient expansion through one or more axial turbines.

The above objectives, and others which will appear, are met by treating the solid fossil fuel, such as coal, to separate the volatile content, thereby providing two types of fuel feeds for the system, namely, (1) fluid fuel consisting of the volatiles in either gaseous, or condensed liquid form, or both, this fluid fuel being comparatively free from particulate material, and (2) residual solid fuel which also contains the inert consituents of the original solid fuel. The fluid fuel is used to power one or more conventional axial turbines. The solid fuel is burned external of any turbine, and its heat of combustion is added to the compressed air supplied to the axial turbines(s) by means of heat exchange systems imparting a considerable temperature rise to the compressed air. Thereafter, the fluid fuel is utilized as previously noted. This may be done by injecting it into the hot compressed air within suitable burner chambers, and igniting it to further raise the temperature of the turbine air to a level where efficient gas expansion can be effected. Thus, the turbine-driving compressed hot air remains clean and appropriately free from particulate matter.

The gaseous combustion products produced by combustion of the residual solids are also preferably further utilized, to drive a disc-type turbine and possibly also to produce air preheating for the combustion process.

For further details, reference is made to the description which follows, in the light of the accompanying drawings, wherein:

The single FIGURE shows a block diagram of a preferred embodiment of the turbine system embodying the invention.

In this diagram of the system, lines (with arrows to denote direction of movement), are used to indicate connections between the individual elements, by means of which streams of substances utilized in the system are transported from one such element to another. The reference numerals which appear adjacent some of these connection-denoting lines correspond to those shown in the chart which also forms part of the drawing. That chart shows typical values calculated for various parameters of the substances flowing through the connections identified by said numerals. The units in which these parameters are expressed are also given in the chart.

The drawing, to which reference may now be had, shows a system utilizing coal as the source of energy.

A coal preparation and liquid extraction unit 20 is fed coal from a source 21 thereof. Preferably, an alkaline earth compound, such as limestone, is also supplied to unit 20 from a source 22 thereof, mixed with the coal, and the mixture heated in a reactor to drive off the volatiles. These are passed through a bed of a suitable alkaline earth compound, such as limestone, in which they are scrubbed and much of the organic and inorganic sulfur contained in the native coal removed. The volatile matter is thereafter made available for further use in fluid form. Those portions of the volatiles which condense at the prevailing ambient conditions are captured in liquid form. Those which do not so condense are left in gaseous form. In either case, they may be stored until used, in suitable bulk containers (not shown). The residual solid matter contains largely coke and inert substance, and this residual solid matter is fed as fuel to a combustion heater 23. Heat for the coal treatment and devolatilization in unit 20 may be provided by high temperature exhaust gas from turbine 24.

It should be noted that no special pains are taken to extract and liquify all possible combustible ingredients present in the native coal. Rather, a simple distillation is used. Other combustible matter can be left in solid form because it is effectively utilized elsewhere in the system. Equipment suitable for use as unit 20 is well known and need not be further described.

An air compressor 25 may provide high pressure air for any turbines forming part of the system, and also for the combustor 23 if desired, provision being made in conventional manner for these compressed air pressures to be of different values, as required by the devices to which they are supplied. The air supply for combustion heater 23 may be preheated by the exhaust gas from the same combustion heater, preferably after expansion through a disc-type turbine 26 as hereinafter explained, and is then introduced into the combustion heater 23 along with the solid fuel from the aforedescribed fuel treatment and devolatilization unit 20. Such combustion heaters may take any of a variety of known forms and need therefore not be described in detail here. For example, this combustion heater may be a pulverized-coal type unit, a grate-type unit, or even a fluidized bed combustor.

Heat is removed from combustion heater 23 by containment tubes 23a, which are heated by the products of combustion and through which is pumped a liquid metal working fluid, such as that known as NaK, which is an alloy of sodium and potassium. These products of combustion within combustion heater 23 are then expanded through turbine 26 to atmospheric pressure, and the turbine delivers useful shaft horsepower. The expanded gas is then passed through heat exchanger 27, wherein it is further cooled, in the process heating the combustion air for combustion heater 23.

The liquid metal working fluid which has been heated by the products of combustion in combustion heater 23 is pumped through a multitude of tubes in a heat exchanger 28 in which it is cooled as described below, and then returned to the combustion heater 23 for reheating.

Compressed air from air compressor 25 is also directed through heat exchanger 28 and past the liquid metal-containing tubes therein; the air is thereby heated, while the liquid metal is correspondingly cooled. The resultant hot, compressed air is introduced into combustion unit 29, wherein fuel, gaseous, liquid or both, which has been extracted from the coal in coal treatment and devolatilization unit 20, is injected and ignited to further increase the temperature of the air. Thereafter the hot gas is expanded to a lower pressure through gas turbine 30 and exhausted into a second combustion unit 31 wherein additional quantities of the liquid fuel are injected and ignited to reheat the gas to significantly higher temperatures. The reheated gas is then expanded to atmospheric pressure through gas turbine 24.

The hot exhaust from turbines 30 and 24 is utilized finally to operate coal treatmet and devolatilization unit 20, as previously noted.

Additional air from heat exchanger 28 may also be supplied to turbine 24, via combustion unit 31, as required.

It should be noted that neither heating in heat exchanger 28, nor the injection and combustion of fuel in combustor unit 29 and 31 introduces appreciable erosive or corrosive agents into the turbine air, thus averting excessive failures or shortened equipment life.

Analysis has indicated that further advantage may be attainable if the combustion heater 23 is operated under elevated pressure and the energy of the gases evolved in the combustion heater is partially recovered by turbine 26. Because these gases do contain erosive particulate matter, it is preferred to depart from axial turbine design for that element.

A so-called Tesla, or disc-type turbine may be used. Such a turbine includes an assembly of a multitude of circular discs mounted on a shaft and perpendicular to it, with openings in the discs located in close proximity to the shaft. The aforedescribed rotor assembly is mounted in bearings and enclosed in a housing with end seals to prevent leakage. Hot compressed gas is directed through nozzles into the housing, tangential to the outer periphery of the rotor, follows a helical path between the discs and discharges through the centrally located holes, imparting a torque to the discs by virtue of the difference in velocity between the gas and the disc surfaces.

As an additional refinement, provision may be made for bleeding a small amount of the gas from the outermost convolution of the Tesla turbine housing, where the particulate matter tends to accumulate due to the centrifuge effect imparted to the gas and its contained particulate matter. In this way, a substantial part of the particulate matter may be removed with only a small amount of the gas.

As previously noted, the chart forming part of the drawing shows values of parameters at various points in the system. However, it is emphasized that these are calculated values, arrived at on the basis of various assumptions concerning raw materials, types of elements and other variables. They are given here only to provide a general feeling for the kinds of parameter values which may be encountered, and are not to be taken as representing the conditions in a specific actual system.

It will also be understood that various embodiments of the system described above are possible within the skill of the art.

For example, instead of a two-stage turbine set consisting of turbines 24 and 30, a single turbine may be employed, its exhaust gas being used to supply a preheater (not shown) connected in the air stream between compressor 25 and heat exchanger 28 and thereafter to supply coal preparation unit 20. Likewise the disc-type turbine 26 may be omitted, in which case the combustion heater 23 need not be supercharged, since high-pressure gas to operate turbine 26 is then not needed. However, since a supercharged combustion heater is considerably smaller than an equivalent unit not operating at high pressure, space and size considerations must also be taken into account.

It will be understood that the turbine system is not limited to use in the generation of electricity. Rather, any desired use may be made of same, including, for example, ship propulsion.

We claim:

1. A turbine system comprising; a first turbine and means for heating operating gas for said first turbine including means for directly combustion heating said gas and means for indirectly combustion heating said gas means for deriving the fuels for both said heating means from a common fuel, said deriving means comprising means for separating from the common fuel, volatile constituents, leaving residual solid matter; means for combusting said residual solid matter; and a disc-type turbine operated by the products of combustion from said residual solid matter combustion means.

2. A solid fossil fuel operated turbine system comprising:

at least one axial turbine; and operating air supply means to said turbine, including a combustion unit for direct heating, and heat exchange means for indirect heating of said air, said combustion unit being supplied with volatile constituents of said fossil fuel, said heat exchange means being supplied with heat through a circulating medium heated by combustion of the residual solid matter of said fossil fuel, and a disc-type turbine operated by the product of combustion of the residual solid matter.

3. In a gas turbine system including at least one axial gas turbine and employing solid fossil fuel as the energy source:
- means for separating from said fuel volatile constituents, leaving residual solid matter;
- means for combusting said residual solid matter at elevated pressure;
- liquid metal heat exchange means for absorbing heat from said combustion;
- means for utilizing said absorbed heat to heat compressed air;
- means for combusting said volatile constituents in said heated compressed air to further raise its temperature;
- means for utilizing said raised temperature air to operate said turbine; and
- a disc-type turbine operated by the products of combustion from said solid matter combustion means.

4. The system of claim 3, wherein said separating means comprises a reactor supplied with a mixture of said solid fossil fuel and alkaline earth compounds.

5. The system of claim 4, wherein volatile constituents are chemically treated by means of an alkaline compound bed traversed by said constituents.

6. The system of claim 3, wherein said solid fossil fuel is coal, and said residual solid matter is principally coke and inert material.

7. The system of claim 3, further comprising means for utilizing said products after passage through said disc-type turbine to preheat air supplied to said solid matter combustion means.

8. The system of claim 3, wherein said disc-type turbine includes means for extracting particulate matter forming part of said combustion products.

9. The system of claim 3, comprising at least two axial turbines, the exhaust gas from one being supplied to operate the next, and means for combusting said volatile constituents in the gas input to each of said turbines to heat said gas input to turbine operating temperature.

10. The system of claim 3, wherein the exhaust from said turbine is utilized to operate said fuel separating means.

11. The system of claim 3, wherein the exhaust from said solid matter combustion means is utilized to operate said fuel separating means.

* * * * *